United States Patent
Fukuoka et al.

(10) Patent No.: US 11,235,831 B2
(45) Date of Patent: Feb. 1, 2022

(54) STRADDLE TYPE VEHICLE

(71) Applicant: HONDA MOTOR CO., LTD., Tokyo (JP)

(72) Inventors: Tsubasa Fukuoka, Wako (JP); Takashi Tetsuka, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 17/022,576

(22) Filed: Sep. 16, 2020

(65) Prior Publication Data
US 2020/0407003 A1 Dec. 31, 2020

Related U.S. Application Data

(63) Continuation of application No. PCT/JP2018/013424, filed on Mar. 29, 2018.

(51) Int. Cl.
| | |
|---|---|
| *B62J 29/00* | (2006.01) |
| *B62J 50/22* | (2020.01) |
| *G06K 9/00* | (2006.01) |
| *G06K 9/46* | (2006.01) |
| *G06T 11/00* | (2006.01) |

(52) U.S. Cl.
CPC .............. *B62J 50/22* (2020.02); *B62J 29/00* (2013.01); *G06K 9/00805* (2013.01); *G06K 9/4652* (2013.01); *G06T 11/001* (2013.01); *G06K 2209/23* (2013.01)

(58) Field of Classification Search
CPC ....... B62J 50/22; B62J 29/00; G06K 9/00805; G06K 9/4652; G06K 2209/233; G06T 11/001; G09G 5/02
See application file for complete search history.

(56) References Cited

U.S. PATENT DOCUMENTS

| | | | |
|---|---|---|---|
| 6,630,888 | B2 | 10/2003 | Lang et al. |
| 8,119,968 | B2 | 2/2012 | Bigolin |
| 10,766,364 | B2 | 9/2020 | Tsai et al. |
| 2002/0014975 | A1 | 2/2002 | Lang et al. |

(Continued)

FOREIGN PATENT DOCUMENTS

| | | |
|---|---|---|
| JP | 2000238579 A | 9/2000 |
| JP | 2005130011 A | 5/2005 |

(Continued)

OTHER PUBLICATIONS

Translation of specification, JP2005-130011 (Year: 2005).*

(Continued)

*Primary Examiner* — Antonio A Caschera
(74) *Attorney, Agent, or Firm* — Thomas Horstemeyer, LLP

(57) ABSTRACT

A straddle type vehicle includes a side mirror with which a rider confirms a rear side; a detection unit configured to detect another vehicle in a periphery of a self-vehicle; and a display unit configured to display a detection result by the detection unit. The display unit displays the detection result at a position within a contour of the side mirror and on an inner side in a vehicle width direction. In a case in which the another vehicle is detected by the detection unit, the display unit displays a color different from a display color of the detection result in a peripheral portion of a display region of the detection result.

4 Claims, 15 Drawing Sheets

(56) References Cited

U.S. PATENT DOCUMENTS

| | | |
|---|---|---|
| 2003/0016125 A1 | 1/2003 | Lang et al. |
| 2009/0316285 A1 | 12/2009 | Bigolin |
| 2012/0062743 A1* | 3/2012 | Lynam .............. B60W 50/0098 |
| | | 348/148 |
| 2012/0200427 A1 | 8/2012 | Kamata |
| 2018/0272866 A1 | 9/2018 | Tsai et al. |

FOREIGN PATENT DOCUMENTS

| | | |
|---|---|---|
| JP | 2017218113 A | 12/2007 |
| JP | 2011213186 A | 10/2011 |
| JP | 2012164237 A | 8/2012 |
| JP | 2016136326 A | 7/2016 |
| JP | 3214299 U | 1/2018 |
| WO | 2019186949 A1 | 10/2019 |

OTHER PUBLICATIONS

International Search Report for PCT/JP2018/013424 dated Jun. 26, 2018.
IPRP for PCT/JP2018/013424 mailed Jun. 9, 2020.

* cited by examiner

SECTION III-III

SECTION III-III

SECTION IV-IV

SECTION V-V

STRADDLE TYPE VEHICLE

CROSS-REFERENCE TO RELATED APPLICATION

This application is a Continuation of International Patent Application No. PCT/JP2018/013424, filed Mar. 29, 2018, the entire disclosure of which is incorporated herein by reference.

BACKGROUND OF THE INVENTION

Field of the Invention

The present invention relates to a straddle type vehicle that has an information display function.

Description of the Related Art

A straddle type vehicle that has a function to detect the presence of a peripheral vehicle and notify a rider of the presence of the peripheral vehicle has been proposed. For example, Japanese Patent Laid-Open No. 2012-164237 discloses a straddle type vehicle that detects a peripheral vehicle by using inter-vehicle communication and displays the detection result to the rider. A detection result indicating the presence of a vehicle approaching from the rear is displayed on the stay portion of a side mirror (rear view mirror) device or on a display device arranged on a housing portion.

Since the straddle type vehicle has a structure in which the rider rides behind the side mirrors, a part (for example, from the shoulder to the upper arm) of the body of the rider is easily reflected in the inner region of each side mirror in the vehicle width direction, and the rider will need to confirm the rear side of the vehicle in the outer region of the side mirror in many cases. In a structure that displays the presence/absence of another vehicle in the stay portion, the visibility of the display is not necessarily favorable because the length of movement of the rider's line of sight will increase if the rider is to confirm a display related to the other vehicle when he/she is confirming the rear side of the vehicle from the outer region of the mirror. In a structure that has a display device arranged in the housing portion, the shape of the side mirror can be restricted, and this may degrade the design.

SUMMARY OF THE INVENTION

An object of the present invention is to improve the visibility of a result showing the detection of another vehicle while ensuring a degree of freedom in the shape of each side mirror.

According to an aspect of the present invention, there is provided a straddle type vehicle comprising: a side mirror with which a rider confirms a rear side; a detection unit configured to detect another vehicle in a periphery of a self-vehicle; and a display unit configured to display a detection result by the detection unit, wherein the display unit displays the detection result at a position within a contour of the side mirror and on an inner side in a vehicle width direction, and in a case in which the another vehicle is detected by the detection unit, the display unit displays a color different from a display color of the detection result in a peripheral portion of a display region of the detection result.

Further features of the present invention will become apparent from the following description of exemplary embodiments (with reference to the attached drawings).

DESCRIPTION OF THE EMBODIMENTS

Figure 1:
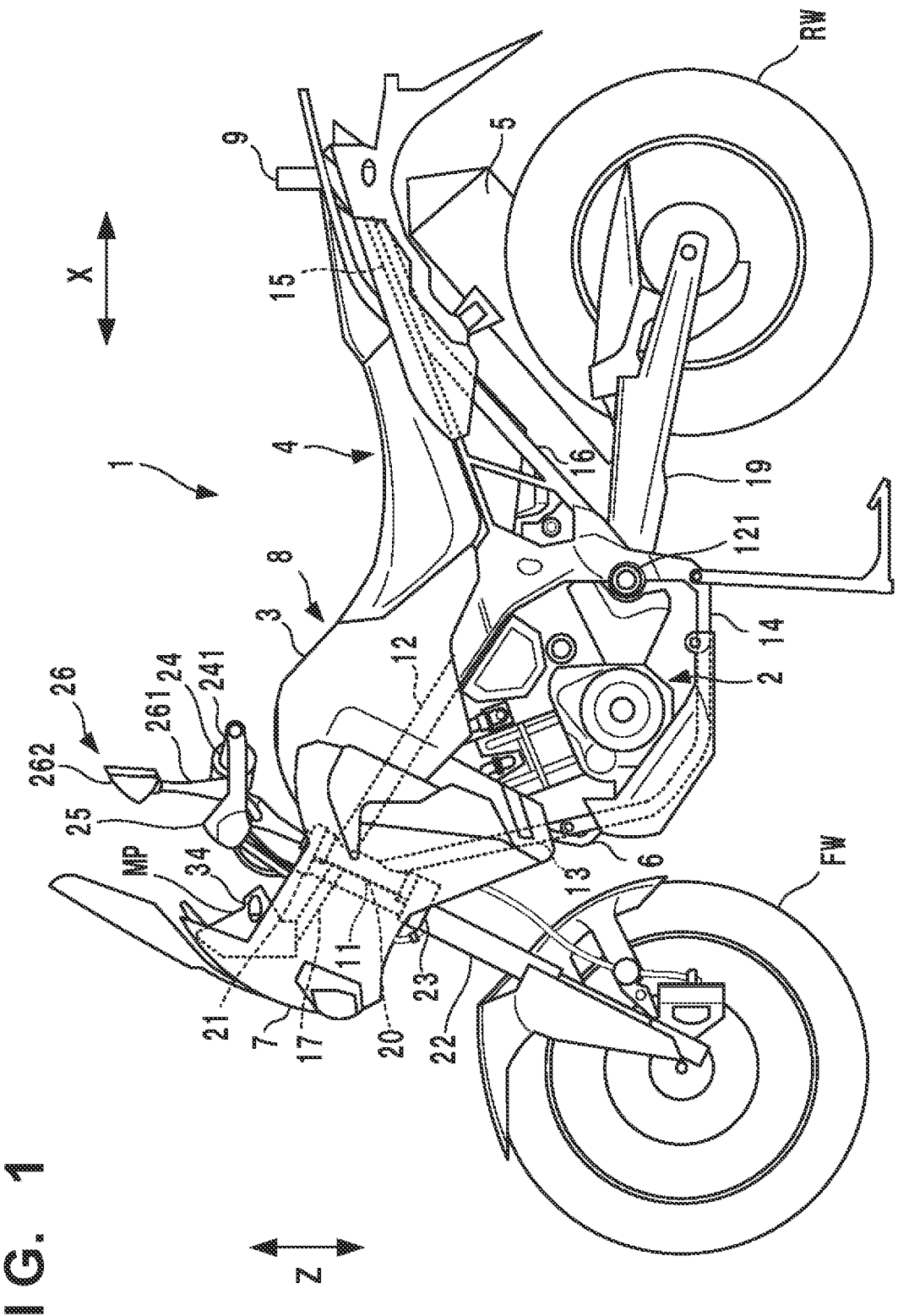
FIG. 1 is a left side view of a straddle type vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A straddle type vehicle according to an embodiment of the present invention will be explained below with reference to the accompanying drawings. In each drawing, arrows X, Y and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The front or rear in the front-and-rear direction of the straddle type vehicle will simply be called the front or rear in some cases. Also, the inner side or outer side in the vehicle width direction (left-and-right direction) of the straddle type vehicle will simply be called the inside or outside in some cases.

First Embodiment

<Outline of Straddle Type Vehicle>

Figure 2:
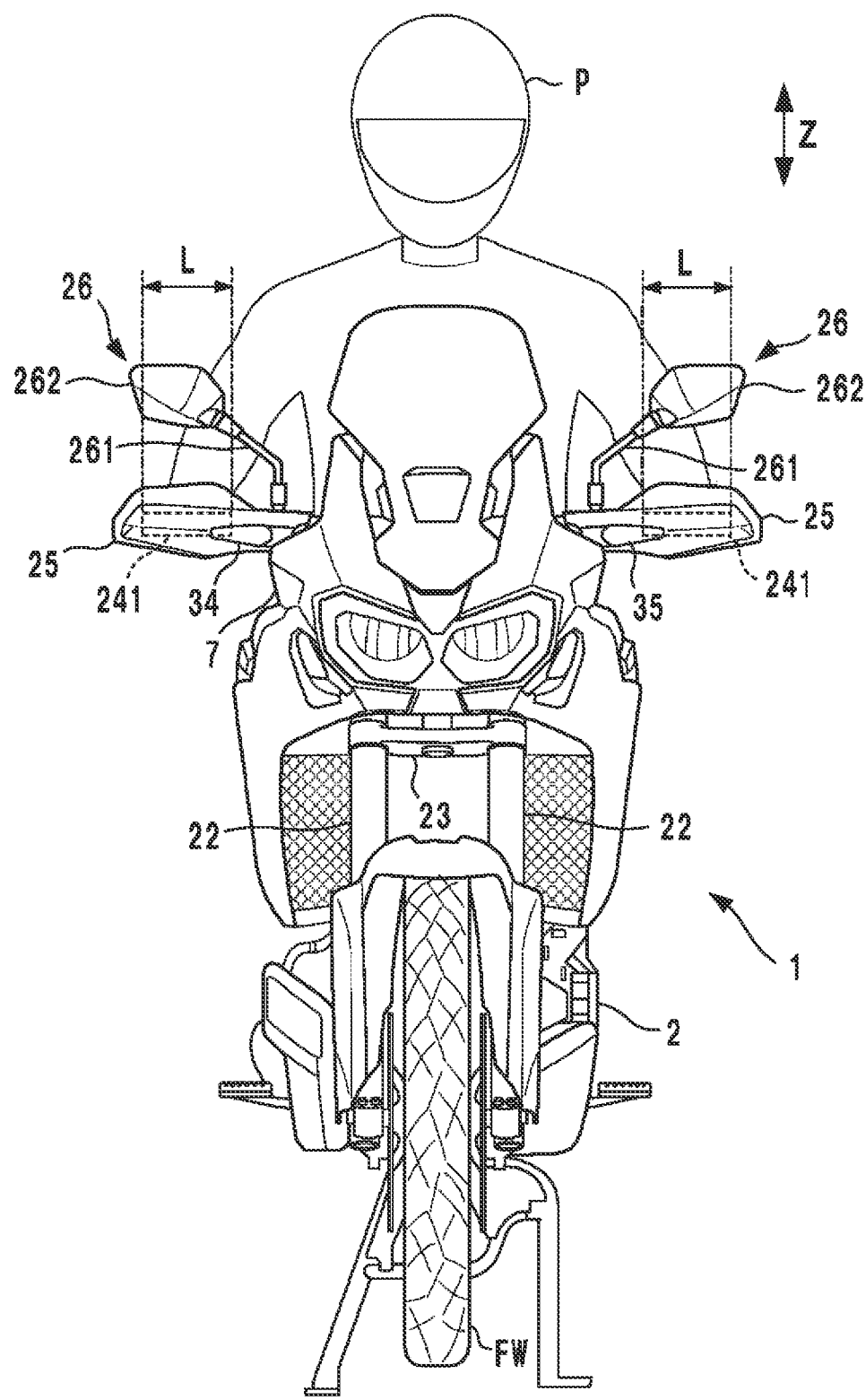
FIG. 2 is a front view of the straddle type vehicle of FIG. 1.

FIG. 1 is a left side view of a straddle type vehicle 1 according to the embodiment of the present invention, and FIG. 2 is a front view of the straddle type vehicle 1. The straddle type vehicle 1 is an off-road motorcycle. However, the present invention is applicable to various kinds of straddle type vehicles including motorcycles of other forms. The present invention also applicable to a vehicle including an internal-combustion engine as a driving source, and an electric vehicle including a motor as a driving source. In the following description, the straddle type vehicle 1 will sometimes be referred to as the vehicle 1.

As a vehicle body frame, the vehicle 1 includes a head pipe 11 formed in the front part of the vehicle, a pair of left and right main frames 12, a down frame 13, a pair of left and right lower frames 14, and an extending portion 17. Each of the head pipe 11 and the down frame 13 is a single member formed along the center of the vehicle body.

The main frames 12, the down frame 13, and the lower frames 14 are connected into the form of a loop, and a power unit 2 is arranged inside a region surrounded by them. The power unit 2 includes an engine and a transmission. An exhaust pipe 6 for guiding the exhaust gas of the engine to an exhaust muffler 5 is formed in front of the power unit 2.

The main frames 12 have a portion that branches into left and right parts, are attached to the upper portion of the head pipe 11, and obliquely extend downward and backward by curving to the left and right above the power unit 2. The down frame 13 is attached to the lower portion of the head pipe 11, and extends downward in front of the power unit 2 by linearly and obliquely descending in the center of the vehicle, and the lower end portion thereof is connected to the front end portions of the pair of left and right lower frames 14. The pair of left and right lower frame 14 curve from the front lower side portions of the power unit 2 to below the power unit 2 and almost linearly extend backward, and the rear end portions thereof are connected to the lower end portions of the pair of left and right main frames 12.

A fuel tank 3 supported by the main frames 12 is arranged above the power unit 2. A seat 4 on which a rider sits is arranged immediately behind the fuel tank 3. The seat 4 is supported on a pair of left and right seat frames 15. The pair of left and right seat frames 15 include front ends attached to the pair of left and right main frames 12, and are extended backward. A pair of left and right rear frames 16 are connected to the seat frames 15 and the main frames 12.

A steering stem 20 is pivotally supported by the head pipe 11, and atop bridge 21 is attached to the upper end portion of the steering stem 20. A bottom bridge 23 is attached to the lower end portion of the steering stem 20.

A pair of left and right front forks 22 are supported by fork insertion holes (not shown) in the left and right end portions of the top bridge 21. The pair of front forks 22 are also supported by the bottom bridge 23. A front wheel FW is rotatably supported at the lower end portions of the pair of front forks 22 and can be steered by a handlebar 24 attached to the top bridge 21.

The front end portion of a rear swing arm 19 is swingably supported by mainframes 12 by using a pivot shaft 121. A rear wheel RW is supported by the rear end portion of the rear swing arm 19, and rotated by a chain (not shown) wound around a drive sprocket (not shown) of the power unit 2 and a driven sprocket (not shown) of the rear wheel RW.

The extending portion 17 is arranged so as to extend frontwards from the head pipe 11, and a meter panel MP is supported by the extending portion 17. The meter panel MP displays various kinds of information such as the vehicle speed, the engine speed, and the like of the vehicle.

A front cowl 7 is arranged so as to cover the meter panel MP, the front forks 22, and the like from the front side to the lateral sides. Furthermore, the left and right handlebar turn signals (direction indicators) 34 are arranged so as to protrude from the lateral sides of the meter panel MP to the outer side in the vehicle width direction.

A sensor 9 is arranged on the rear side of the seat 4. The sensor 9 is a sensor for detecting another vehicle in the periphery of the self-vehicle 1 while the vehicle 1 is traveling, and is, for example, an ultrasonic sensor, millimeter wave radar, a camera, or the like. In the case of this embodiment, the detection range of the sensor 9 is the rear left and rear right sides of the vehicle 1, and the sensor 9 detects another vehicle which approaches the self-vehicle 1 from the rear side. Note that although the sensor 9 is arranged on the rear side of the seat 4 in this embodiment, the arrangement of the sensor 9 is not limited to this. For example, the arrangement location of the sensor 9 can be at one of the rear portion, the lateral portions, and the front portion of the vehicle 1. A plurality of the sensors 9 can also be arranged by arranging one sensor on each of the left side and the right side.

A handlebar grip 241 which is to be gripped by the rider is arranged at each of the left end and the right end of the handlebar 24. Brake levers, clutch levers, and the like (not shown) are arranged adjacent to the left and right handlebar grips 241 of the handlebar 24. Left and right guard portions 25 which protect the rider's hands are supported on the side of the handlebar 24. Each of the left and right guard portions 25 is arranged so as to cover the front of the corresponding one of the left and right handlebar grips 241.

Figure 3:
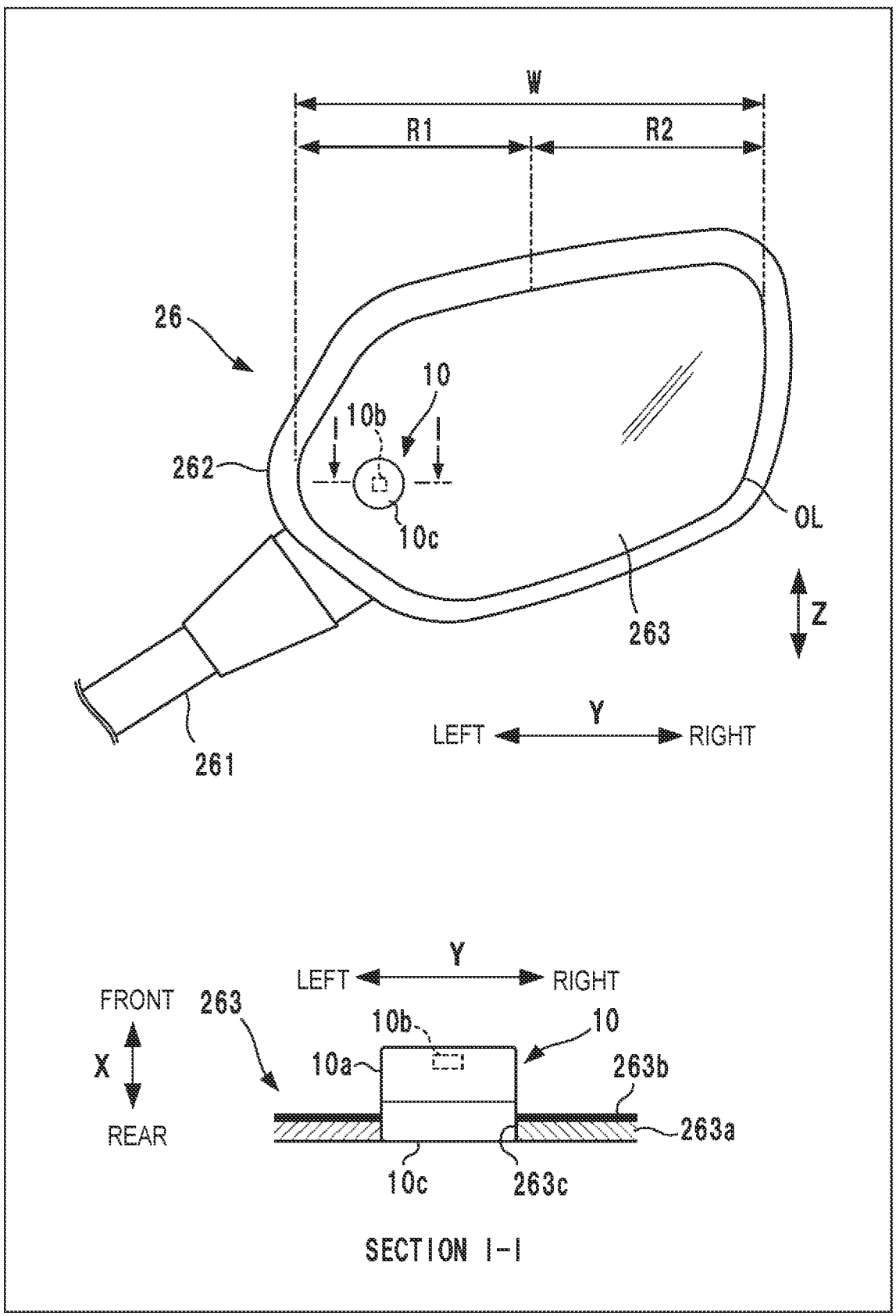
FIG. 3 is an explanatory view and a sectional view taken along a line I-I of a side mirror unit.

Left and right mirror units 26 are arranged on the handlebar 24. The arrangement of each mirror unit 26 will be described with reference to FIG. 3 in addition to FIGS. 1 and 2. FIG. 3 shows a view in which the right mirror unit 26 is seen from the rear side and a sectional view of a side mirror 263 taken along a line I-I. The left mirror unit 26 also has an arrangement similar to the arrangement of the right mirror unit 26.

Each mirror unit 26 includes a mirror stay (mirror supporting portion) 261 connected to the handlebar 24 and a mirror housing 262. The mirror housing 262 is attached so that the direction of the mirror stay 261 can be adjusted. The mirror housing 262 is a hollow body with an opening on its rear side, and the side mirror (mirror portion) 263 is attached to the mirror housing 262 so as to close this opening. The rider can visually confirm the rear left side and the rear right side by the side mirrors 263.

In this embodiment, when viewed from the positional relationship between the handlebar grips 241 and the side mirror 263 in the Y direction, at least a part of a range (a width W of FIG. 3) in the Y direction of each side mirror 263 overlaps a range L in the Y direction of each handlebar grip 241 as shown in FIG. 2. Note that although this embodiment has an arrangement in which the left and right mirror units 26 are supported by the handlebar 24, an arrangement in which the mirror units are supported by a component other than the handlebar 24 may also be employed.

Referring to FIG. 3, the side mirror 263 includes a transparent substrate 263a made of glass, a transparent resin, or the like, and a reflective film 263b formed on the back surface of this transparent substrate. An opening portion 263c is formed in the transparent substrate 263a, and a display device 10 is arranged inside the mirror housing 262 so as to face the opening portion 263c. The display device 10 of this embodiment is a light emitting device that includes a light emitting element 10b such as an LED or the like, a cylinder-shaped main body 10a incorporating a substrate (not shown) or the like which supports the light emitting element 10b, and a cover lens 10c which covers the front surface of the main body 10a. The cover lens 10c is exposed to the rear side through the opening portion 263c. The rider can look at the side mirror 263 to visually confirm the lighting of the display device 10 turning on and off.

<Control Unit>

Figure 4:
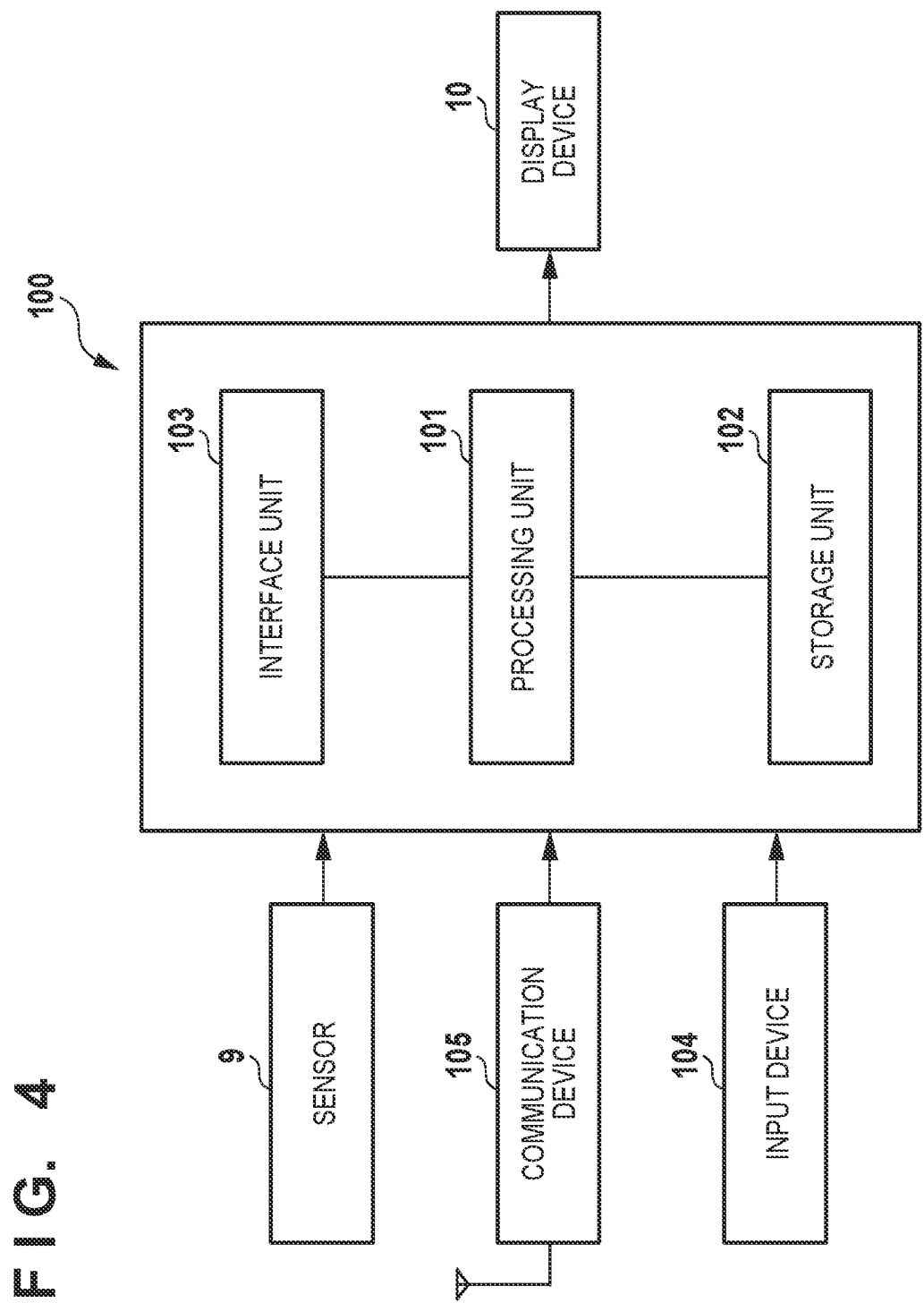
FIG. 4 is a block diagram of a control unit of the straddle type vehicle of FIG. 1.

In this embodiment, the display device 10 is used to notify the rider of a result indicating that another vehicle has been detected in the periphery of the self-vehicle 1. FIG. 4 is a block diagram of the control unit 100 of the vehicle 1 and shows, in particular, the arrangement related to the display control of the display device 10.

The control unit 100 includes a processing unit 101, a storage unit 102 such as a RAM, ROM, or the like, and an interface unit 103 which relays the transmission and reception of signals between an external device and the processing unit 101. The processing unit 101 is a processor represented by a CPU, and executes programs stored in the storage unit 102. The storage unit 102 stores various kinds of data other than the programs to be executed by the processing unit 101. The interface unit 103 includes an input/output interface and a communication interface.

The processing unit 101 performs display control of the display device 10 based on information from the sensor 9, a communication device 105, and an input device 104. The processing unit 101 can obtain, from the sensor 9, a result of the detection of another vehicle. The communication device 105 is a wireless communication device that performs inter-vehicle communication or road-to-vehicle communication. The processing unit 101 can obtain the position information of another vehicle and the like from the communication device 105, and the detection of another vehicle also includes the reception of information via the communication device 105. The processing unit 101 determines the presence of another vehicle approaching the self-vehicle 1 from the rear left side or the rear right side based on the data from the sensor 9 and the communication device 105, and displays the result of the detection of the other vehicle on the display device 10. For example, if another vehicle is detected, the lighting of the display device 10 is turned on. If another vehicle is not detected, the lighting is turned off. Note that a plurality of light emitting elements that can emit different colors of light can be provided so that the color of the emitted light (for example, red) in a case in which another vehicle is detected and the color of the emitted light (for example, blue) in a case in which another vehicle is not detected will be different.

Although the detection of another vehicle can be performed by using both the sensor 9 and the communication device 105 in this embodiment, it is also possible to employ an arrangement in which the detection of another vehicle is performed by using only the sensor 9 or the communication device 105.

The input device 104 is a device for accepting an instruction input from the rider, and is an input device such as a button, a lever a touch panel, or the like. The input device 104 can be arranged in the periphery of the meter panel MP or the periphery of the handlebar grip 241. The rider can enable/disable, for example, the driving of the display device 10 via the input device 104. More specifically, if the rider does not desire to be notified of the approach of another vehicle, he/she can select to disable the driving of the display device 10.

<Display Position>

Figure 5:
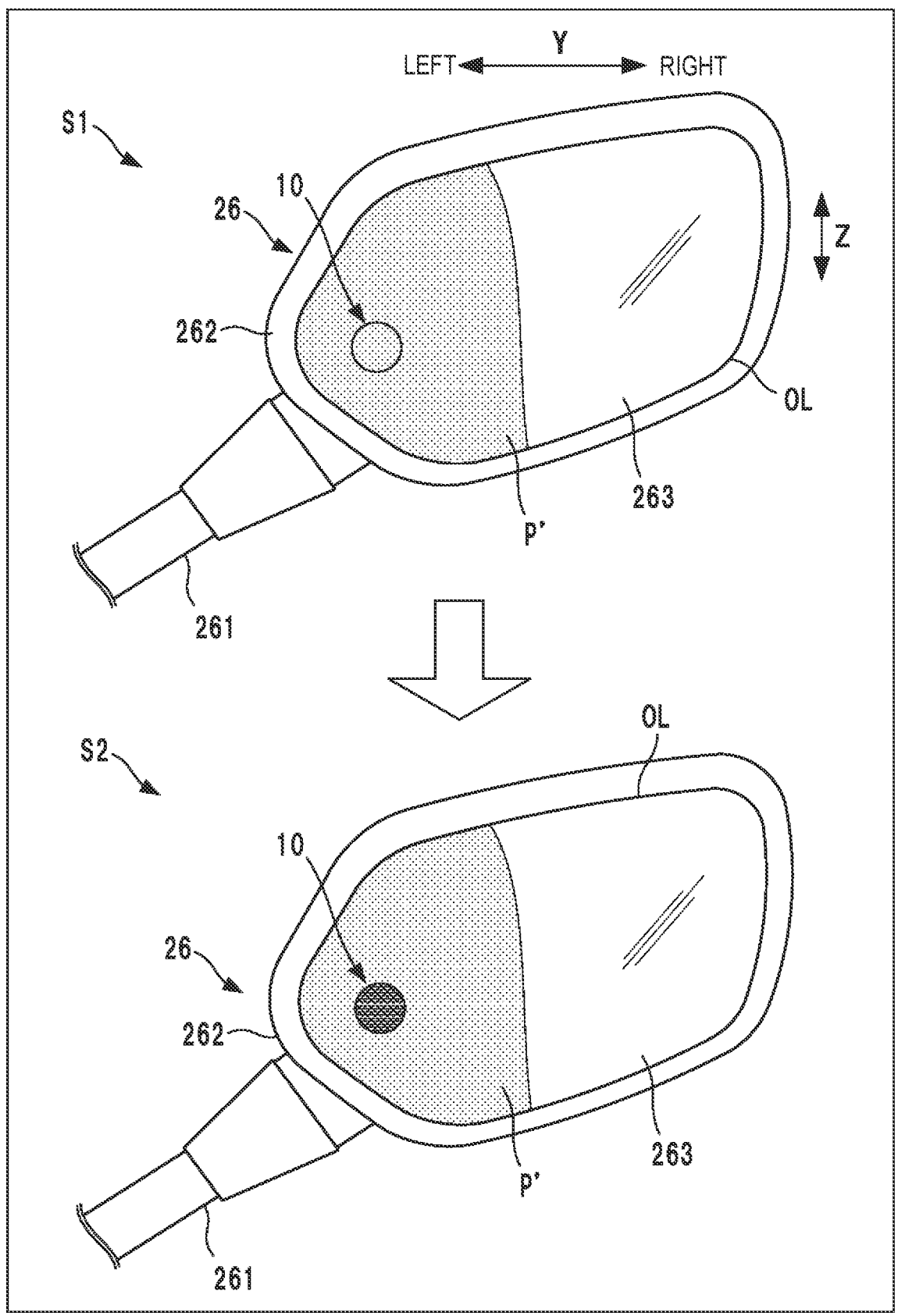
FIG. 5 is a view showing a display example of a display device.

The display position (the display region of the result of the detection of another vehicle) of the display device 10 and a display example of the display device 10 will be described with reference to FIGS. 3 and 5. FIG. 5 is an explanatory view of the operation of the display device 10.

In this embodiment, the display position of the display device 10, that is, the part of the cover lens 10c exposed from the side mirror 263 is positioned inside a contour 0L of the side mirror 263 and positioned inside the side mirror 263 in the Y direction. More specifically, in FIG. 3, the side mirror 263 has the width W in the Y direction. This width W is divided into two equal parts to set an inner region R1 and an outer region R2. The regions R1 and R2 may be demarcated in a state in which the surface of the side mirror 263 is parallel to the Y direction. The display position of the display device 10 is positioned at the region R1.

In general, since the straddle type vehicle has a structure in which the rider rides behind the side mirrors, a part (for example, from the shoulder to the upper arm) of the rider's body tends to be reflected in the inner region of each side mirror in the vehicle width direction. The riding posture of a rider P is illustrated as a reference example in FIG. 2. As shown in FIG. 2, the arms of the rider P are present on the rear sides of the mirror housings 262, that is, the arms are present on the rear sides of the side mirrors 263. Although the direction of each side mirror 263 can be adjusted and although it may depend on the direction of the side mirror 263, a part of the body of the rider P tends to be easily reflected in each side mirror 263 due to the structure.

FIG. 5 shows a state in which apart (arm) P' of the body of the rider P has been reflected in the inner side of the side mirror 263. A state S1 shows a mode in which the lighting of the display device 10 is OFF, and a state S2 shows a mode in which the lighting of the display device 10 is ON. The region of the side mirror 263 reflecting the part P' of the body of the rider P cannot be used by the rider P to visually confirm the rear side of the self-vehicle. The rider P will solely use the outer region of the side mirror 263 to visually confirm the rear side. Hence, the inner region R1 of the side mirror 263 tends to become a "dead space" which is not used for the visual confirmation of the rear side.

By arranging the display device 10 in the region R1, such a dead space can be used effectively. Also, the length of movement of the line of sight from an outer region such as the region R2 to the display device 10 is not too long, and the visibility of the display is favorable. Furthermore, since the display device 10 is positioned inside the contour 0L of the side mirror 263, there will be no restriction on the shape of the contour 0L or the like of the side mirror 263. Hence, according to this embodiment, it will be possible to improve the visibility of the result of the detection of another vehicle while ensuring the degree of freedom in the shape of the side mirror 263.

Second Embodiment

Figure 6:
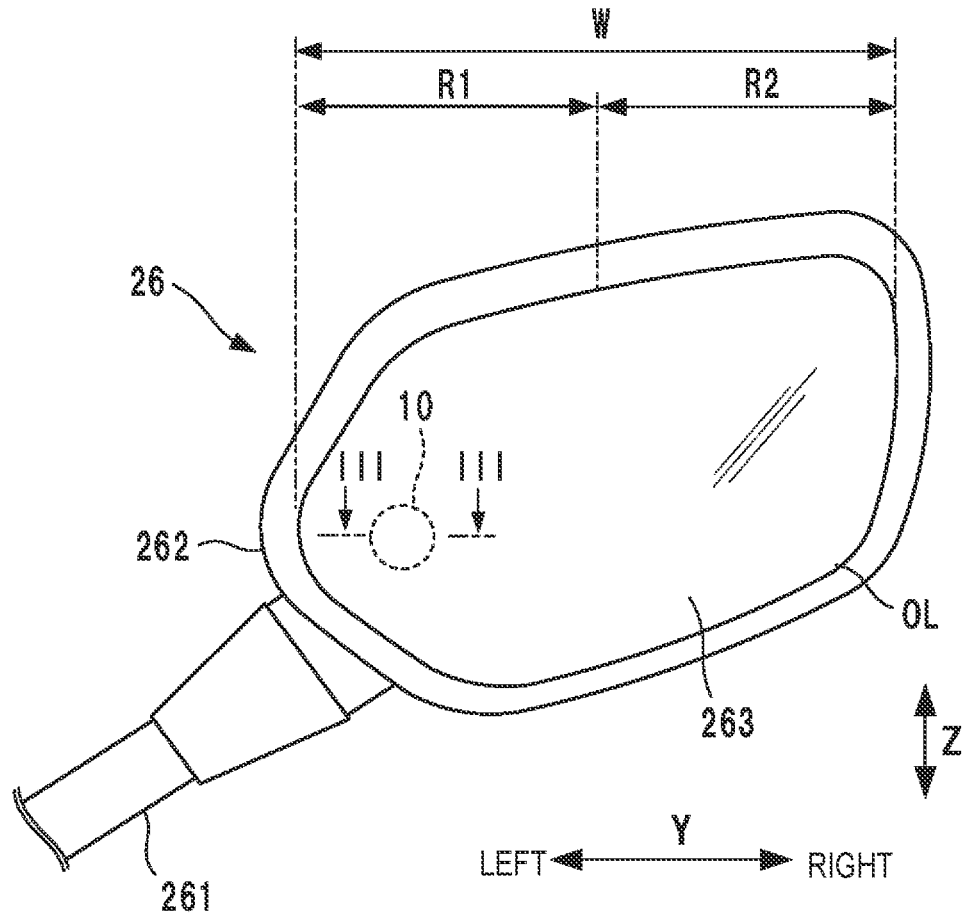
FIG. 6 is an explanatory view and a sectional view taken along a line II-II of a side mirror unit of another example.
Figure 6:
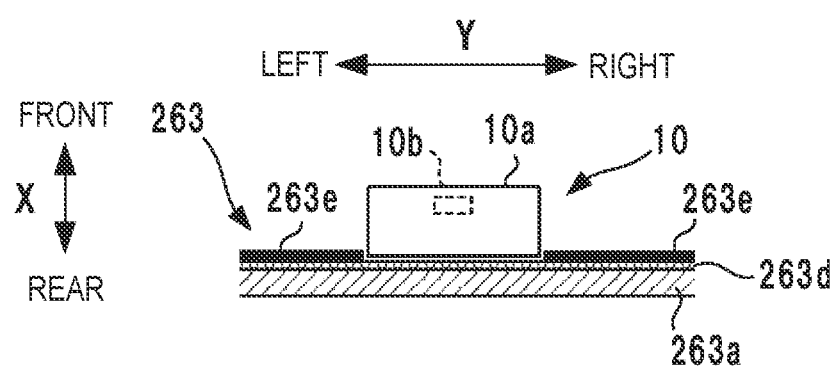

Although the first embodiment has an arrangement in which a part of a display device 10 is exposed to the outside, an arrangement without exposure is also employable. FIG. 6 shows such an example and shows a view in which a right mirror unit 26 is seen from the rear side and a sectional view of a side mirror 263 taken along a line II-II. The left mirror unit 26 also has an arrangement similar to the arrangement of the right mirror unit 26. The same reference numerals are used to denote components which are similar to those of the first embodiment, and a description will be omitted.

The example of FIG. 6 shows an arrangement in which the side mirror 263 is a half mirror and the display device 10 is arranged behind the side mirror 263 and not exposed. A semi-transparent reflective film 263d is formed on the back surface of a transparent substrate 263a in the side mirror 263. A mask 263e is formed in black or the like behind the semi-transparent reflective film 263d. The mask 263e is arranged in a region other than the region between the display device 10 and the transparent substrate 263a. The portion where the mask 263e is arranged functions in a similar manner to a normal mirror, and a portion where the mask 263e is not arranged functions as a half mirror.

Although the display device 10 has an arrangement which does not include a cover lens 10c in the example of FIG. 6, it may have an arrangement which includes the cover lens 10c.

Figure 7:
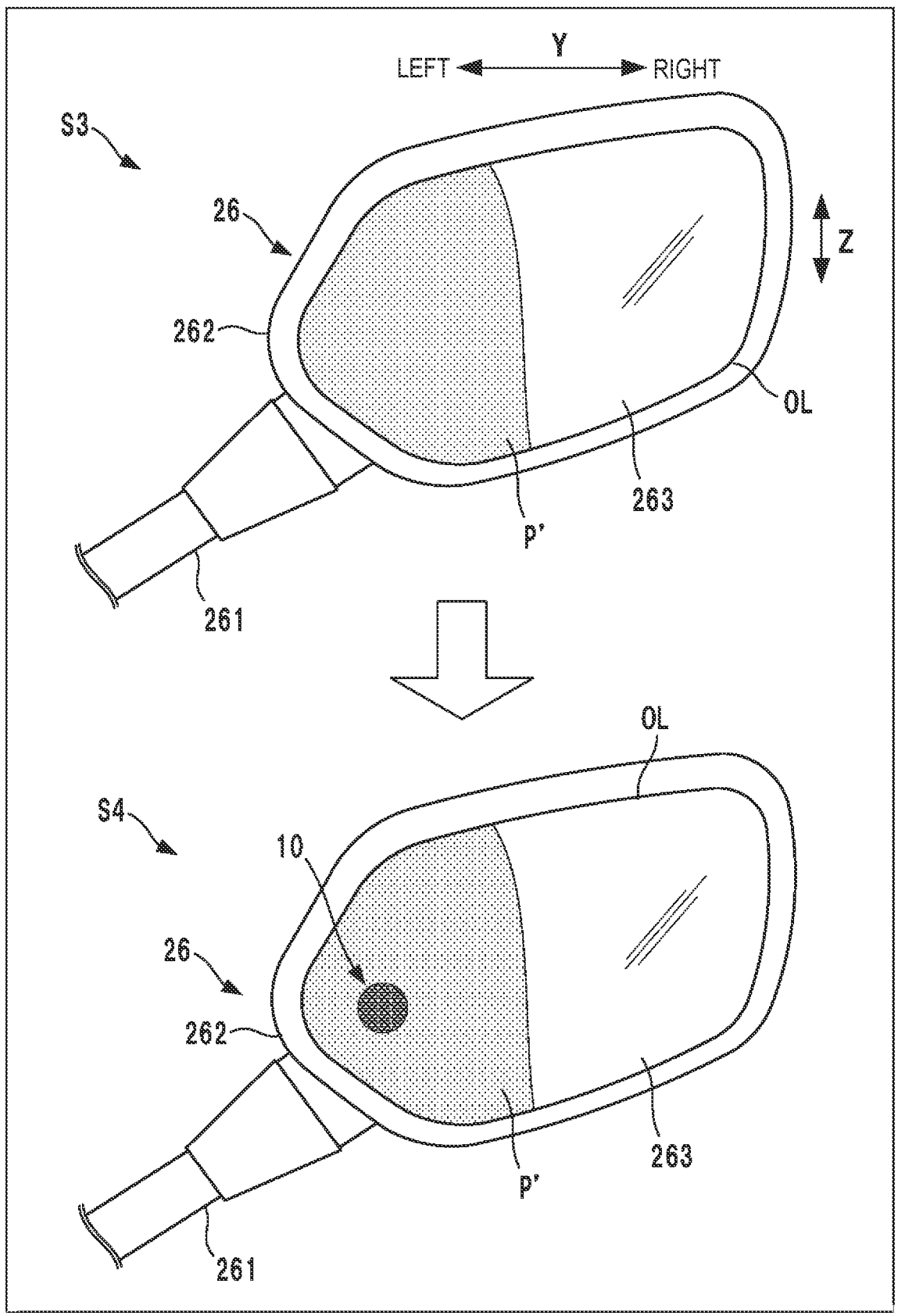
FIG. 7 is a view showing a display example of a display device of the example of FIG. 6.

FIG. 7 is a view showing an example of the operation of the display device 10 according to the example of FIG. 6. FIG. 7 shows a state in which a part (arm) P' of the body of a rider P is reflected in the inner side of the side mirror 263. A state S3 shows a mode in which the lighting of the display device 10 is OFF, and a state S4 shows a mode in which the lighting of the display device 10 is ON. In the mode in which the lighting of the display device 10 is OFF, the display device 10 can become inconspicuous by being hidden by the side mirror 263 so that visual confirmation of the display device will be difficult. The entire region of the side mirror 263 can be used as a mirror for reflecting the rear side, thereby improving the convenience of the rider P and the design of the side mirror 263. In the mode in which the lighting of the display device 10 is ON, the attention of the rider P can be easily drawn since the emitted light will appear on a part of the side mirror 263.

Note that it is also possible to adopt, as an arrangement example in which the display device 10 is hidden behind the transparent substrate 263a, an arrangement other than an arrangement in which a half mirror is used as the side mirror 263. For example, in an arrangement in which a reflective film 263b is formed on the back of the transparent substrate 263a as shown in the example of FIG. 3, the reflective film 263b may be removed from the region between the display device 10 and the transparent substrate 263a.

Third Embodiment

As described above, a part P of the body of a rider P tends to be easily reflected in a region R1 where a display device 10 is arranged. In a case in which the display color of the display device 10 is close to the color of the clothing at the part P' of the rider P, the visibility of the lighting of the display device 10 may degrade. Hence, the color of the peripheral portion of the display region of the display device 10 can be set to a different color from the display color. As a result, the display region of the display device 10 can be emphasized, and the visibility can be improved.

Figure 8:
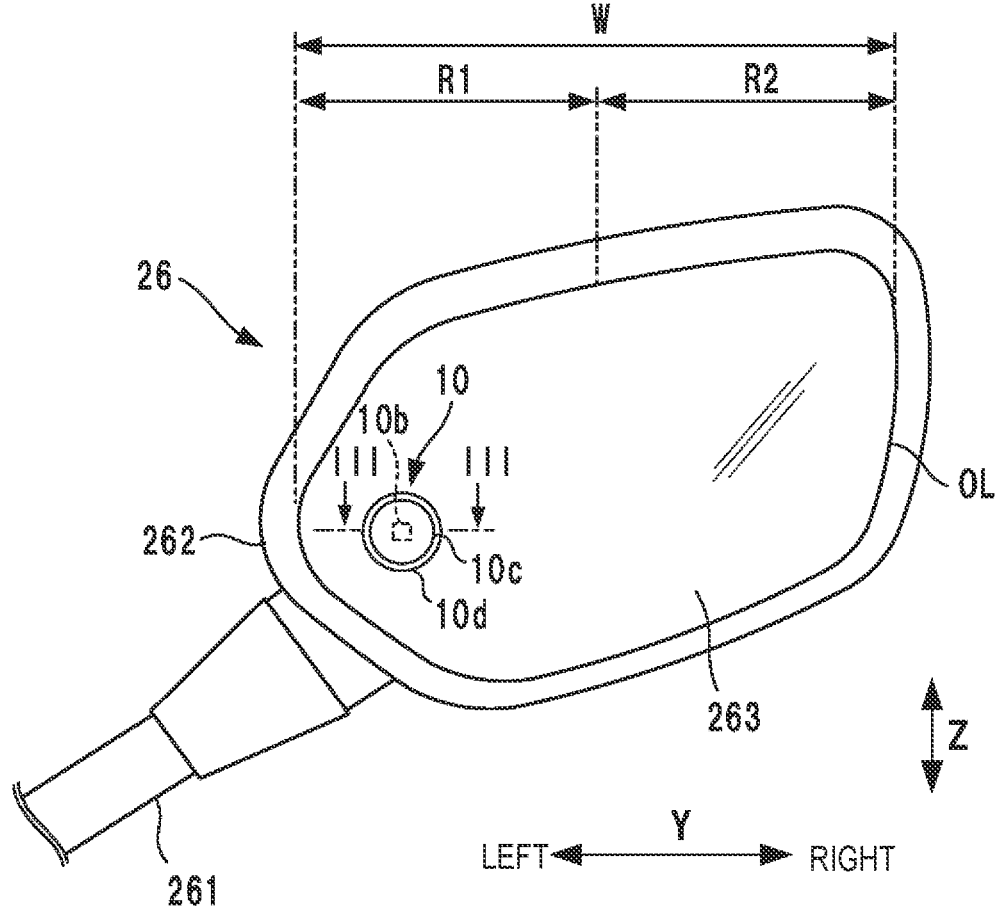
FIG. 8 is an explanatory view and a sectional view taken along a line III-III of a side mirror unit of yet another example.
Figure 8:
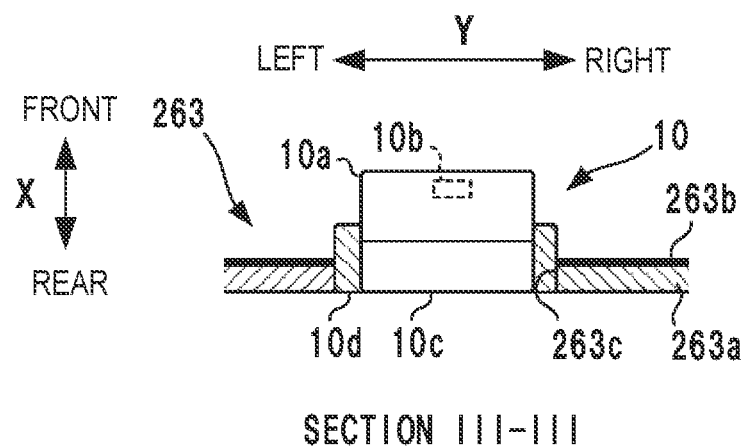

FIG. 8 shows such an example and shows a view in which a right mirror unit 26 is seen from the rear side and a sectional view of a side mirror 263 taken along a line III-III. The left mirror unit 26 also has an arrangement similar to the arrangement of the right mirror unit 26. The same reference numerals are used to denote components which are similar to those of the first embodiment, and a description will be omitted.

In this embodiment, the periphery of the display device 10 is surrounded by an annular peripheral member 10d. The peripheral member 10d is, for example, a resin member that has been colored by a different color from the color of the lighting of the display device 10 and is not transparent. The color of the peripheral member 10d may be, for example, white, black, green, brown, or gray.

Figure 9:
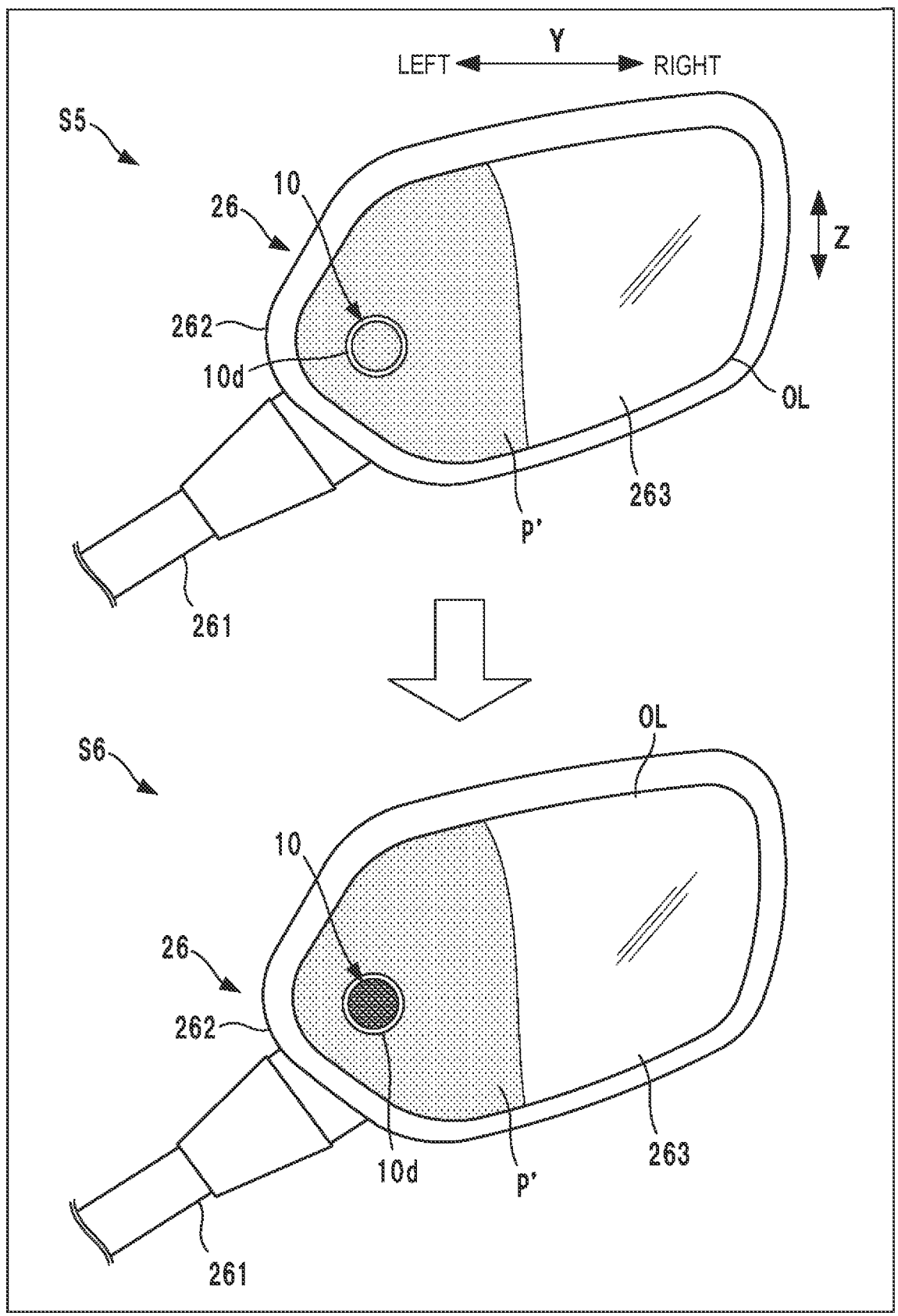
FIG. 9 is a view showing a display example of a display device of the example of FIG. 8.

FIG. 9 is a view showing an example of the operation of the display device 10 according to the example of FIG. 8. FIG. 9 shows a state in which the part (arm) P' of the body of the rider P is reflected in the inner side of the side mirror 263. A state S5 shows a mode in which the lighting of the display device 10 is OFF, and a state S6 shows a state in which the lighting of the display device 10 is ON. Since the part P' of the body of the rider P is more weakly reflected in the peripheral member 10d than in a cover lens 10c, the peripheral member can be visually confirmed easily. Hence, the contour of the display device 10 can be emphasized in either in a case in which the lighting is OFF (S5) and a case in which the lighting is ON (S6), and the visibility of the display device 10 can be improved.

Note that although the peripheral member 10d is arranged as a peripheral portion in the examples of FIGS. 8 and 9, the peripheral portion may be formed by coating a transparent substrate 263a or coloring the transparent substrate by a seal in the periphery of the opening portion 263c in the arrangement example of FIG. 3.

Figure 10:
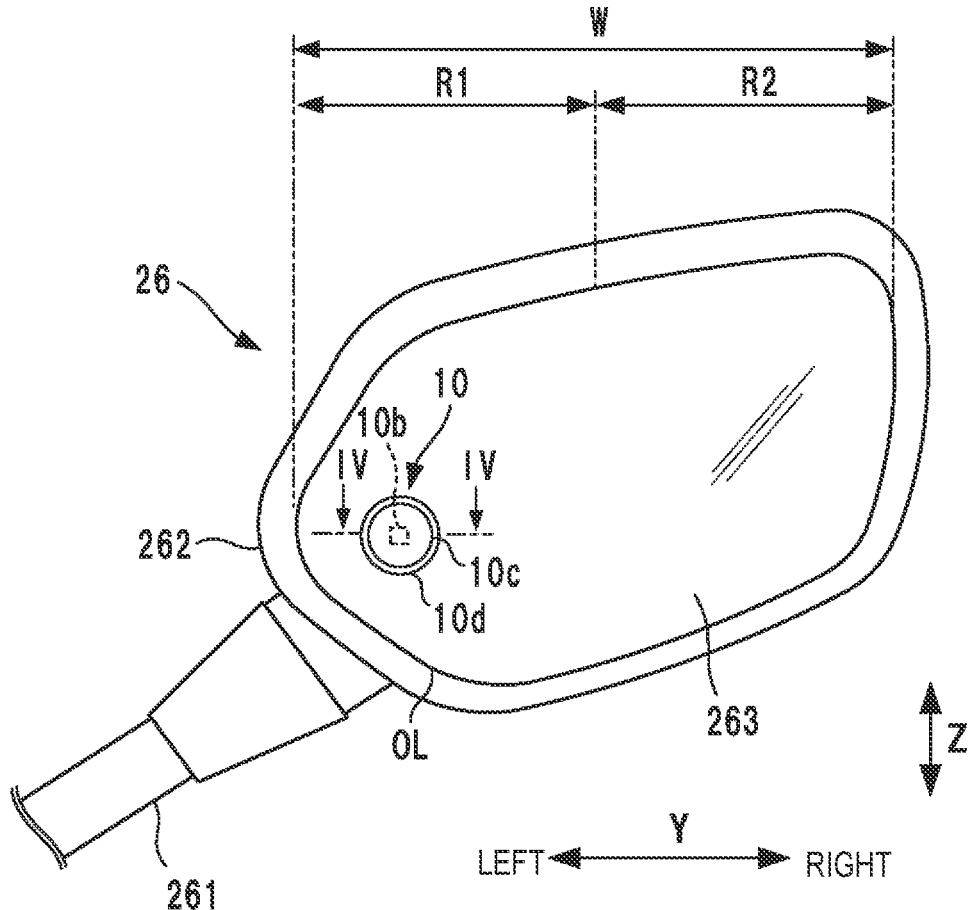
FIG. 10 is an explanatory view and a sectional view taken along a line IV-IV of a side mirror unit of yet another example.
Figure 10:
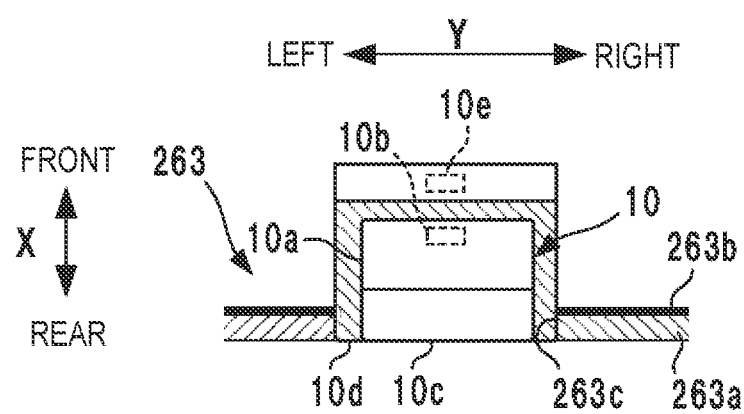

Next, by arranging a light emitting element for the peripheral member 10d in addition to forming the peripheral member 10d by a transparent resin member or the like, the peripheral member 10d may emit light of a color different from the display color of the display device 10. FIG. 10 shows such an example and shows a view in which the right mirror unit 26 is seen from the rear side and a sectional view of the side mirror 263 taken along a line IV-IV. The left mirror unit 26 also has an arrangement similar to the arrangement of the right mirror unit 26. The same reference numerals are used to denote components which are similar to those of the example of FIG. 8, and a description will be omitted. The example of FIG. 10 shows an arrangement in which the peripheral member 10d is transparent and includes a bottom portion which covers the back portion of the display device 10. A light emitting element 10e such as an LED or the like is arranged behind this bottom portion. The color of the peripheral member 10d and the color of the emitted light of the light emitting element 10e are different from the display color of the display device 10.

The peripheral member 10d may constantly emit light or may emit light when the lighting of the display device 10 is to be turned on. In either case, the display region of the display device 10 can be emphasized and the visibility can be improved.

Figure 11:
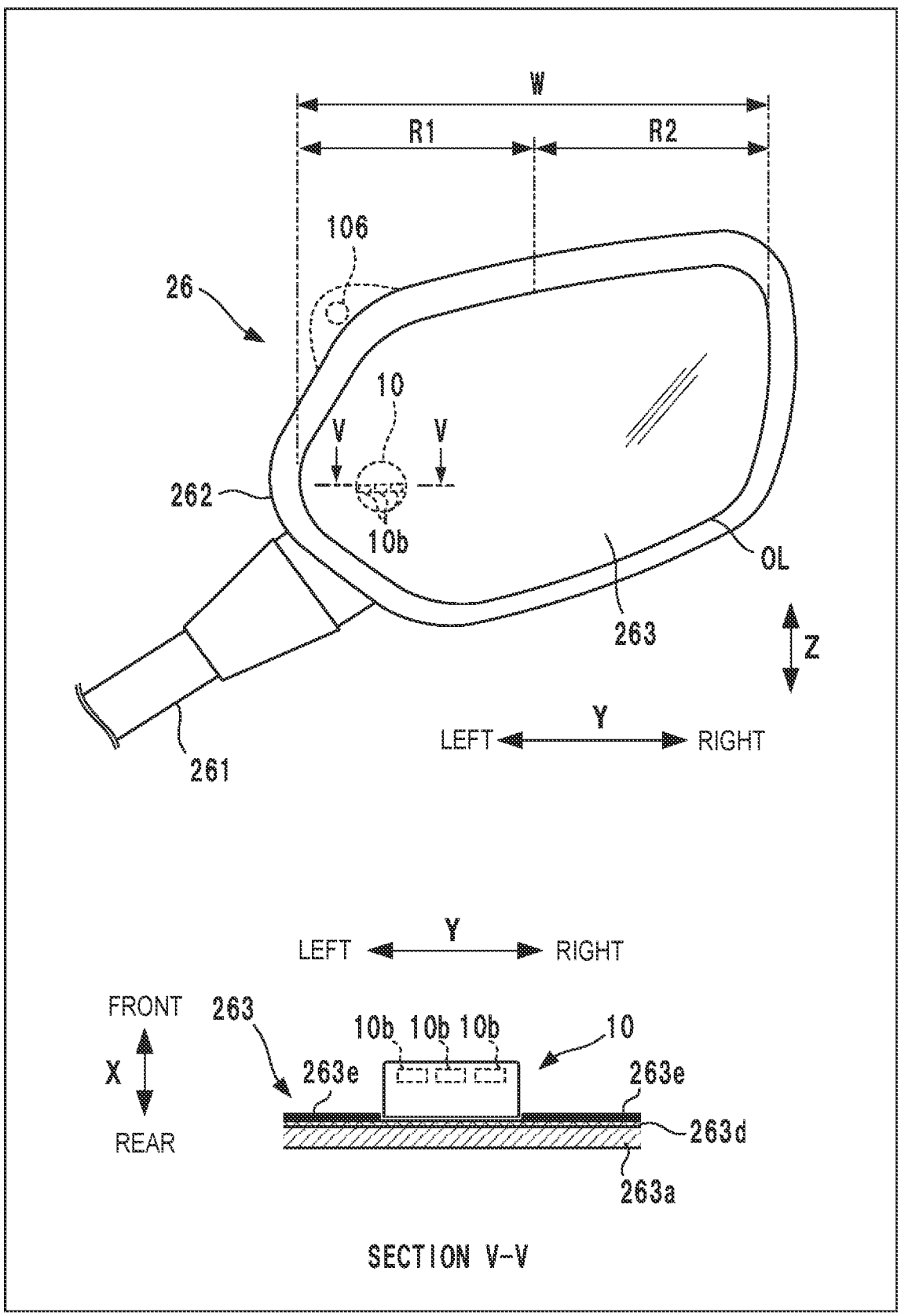
FIG. 11 is an explanatory view and a sectional view taken along a line V-V of a side mirror unit of yet another example.

Next, the display device 10 may be able to emit light in a display color selected from a plurality of colors. FIG. 11 shows such an example and shows a view in which the right mirror unit 26 is seen from the rear side and a sectional view of the side mirror 263 taken along a line V-V. The left mirror unit 26 also has an arrangement similar to the arrangement of the right mirror unit 26. A half mirror is used as the side mirror 263 in the example of FIG. 11 in a similar manner to the second embodiment. The same reference numerals are used to denote components which are similar to those of the second embodiment, and a description will be omitted.

In the example of FIG. 11, a plurality (three in the example of FIG. 11) of light emitting elements 10b such as LEDs or the like that emit different colors of light have been arranged. The display color of the display device 10 can be changed by switching the light emitting element 10b to be turned on. The display color change can be set by the rider P via an input device 104. The rider P can select, for example, a display color different from the color of the clothing which he/she is to wear on the day he/she is to ride the vehicle. This can improve the visibility of the lighting of the display device 10. As another example, a sensor that detects the color of the rider P's clothing can be arranged, and the display color of the display device 10 may be automatically switched based on the detection result of the sensor. A camera 106 fixed to a mirror housing 262 has been illustrated by broken lines as an example of such a sensor in the example of FIG. 11.

The camera 106 is arranged so as to include the rider P within its image capturing range. An image captured by the camera 106 is processed by a processing unit 101, and the color of the rider P's clothing is discriminated. The processing unit 101 selects, among the plurality of light emitting elements 10b, a light emitting element whose color of emitted light differs as much as possible from the discriminated color. The camera 106 may be arranged at only one of the left and right mirror units 26 or may be arranged at a part other than the mirror unit 26.

Fourth Embodiment

Figure 12:
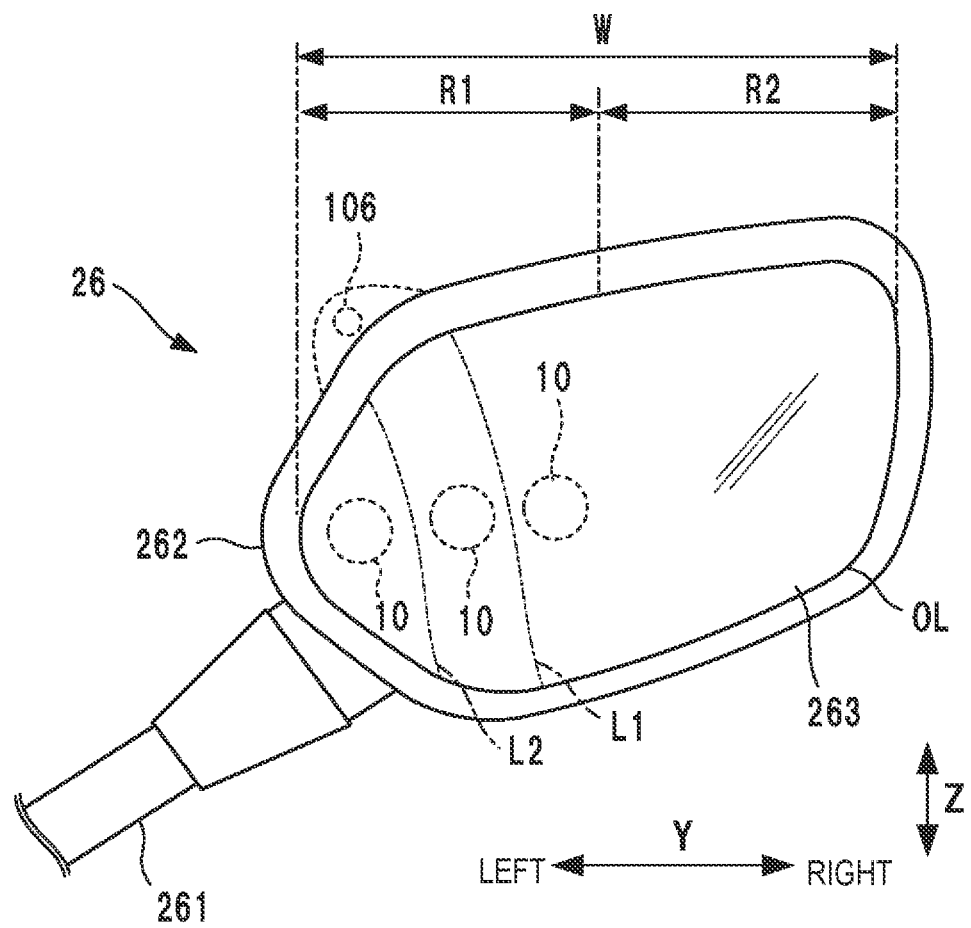
FIG. 12 is an explanatory view of a side mirror unit of yet another example.

It may be arranged so that the display position of a display device 10 can be changed. FIG. 12 shows such an example and is a view in which a right mirror unit 26 is seen from the rear side. The left mirror unit 26 also has an arrangement similar to the arrangement of the right mirror unit 26. A half mirror is used as a side mirror 263 in the example of FIG. 12 in a similar manner to the second embodiment. The same reference numerals are used to denote components which are similar to those of the second embodiment, and a description will be omitted.

In the example of FIG. 12, a plurality (three in the example of FIG. 12) of the display devices 10 are arranged. Although each of the three display devices 10 is arranged within a region R1, each display device is arranged in a different position in the Y direction. If another vehicle is detected, the display device 10 to be turned on can be switched to change the display position.

When the display position is to be changed, it will be possible to use the dead space effectively by selecting the display device 10 which is positioned in a region where the body of a rider P is reflected. For example, in FIG. 12, in a case in which the body of the rider P is reflected in a region which is closer to the inner side than an alternate short and long dashed line L1, the display device 10 at the left end or the middle of the drawing can be selected among the three display devices 10. Also, in FIG. 12, in a case in which the body of the rider P is reflected in a region which is closer to the inner side than an alternate short and long dashed line L2, the display device 10 at the left end the drawing can be selected among the three display devices 10.

When the display position is to be changed, the display device 10 positioned outside the region where the body of the rider P is reflected can be selected to improve the visibility of the display device 10. For example, in FIG. 12, in a case in which the body of the rider P is reflected in a region which is closer to the inner side than the alternate short and long dashed line L1, the display device 10 at the right end of the drawing can be selected among the three display devices 10. Also, in FIG. 12, in a case in which the body of the rider P is reflected in a region which is closer to the inner side than the alternate short and long dashed line L2, the display device 10 at the right end or the middle of the drawing can be selected among the three display devices 10.

The display position change can be set by the rider P via an input device 104. The rider P can select the display position by, for example, confirming the state of the reflection of his/her body in the side mirror 263. As another example, a sensor that detects the contour when the rider P is riding the vehicle may be arranged, the state of the reflection of the rider P in the side mirror 263 may be estimated from the detection result of the sensor, and the display position of the display device 10 may be switched automatically. A camera 106 fixed to a mirror housing 262 is illustrated by broken lines as an example of such a sensor in the example of FIG. 12 in a similar manner to the example of FIG. 11. As an algorithm for automatically switching the display position, the display device 10 which is in a region estimated to be a region where the body of the rider P is reflected may be preferably selected or the display device 10 which is outside a region estimated to be a region where the body of the rider P is reflected may be preferably selected as described above.

Fifth Embodiment

Figure 13:
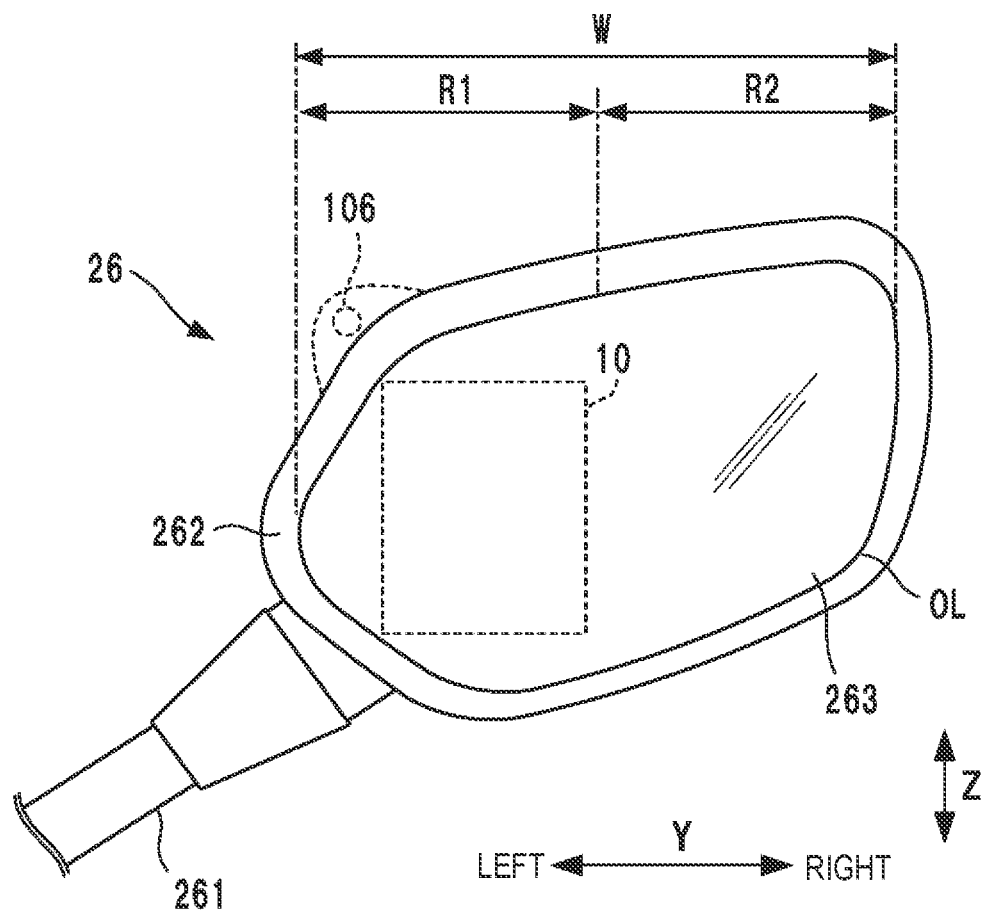
FIG. 13 is an explanatory view on a side mirror unit of yet another example.

Although a display device whose light emitting element 10b used a dot light source such as an LED or the like was assumed to be a display device 10 in the first embodiment to the fourth embodiment, an electronic image display device such as an LCD (liquid crystal display device) or the like may be used. FIG. 13 shows such an example and is a view in which a right mirror unit 26 is seen from the rear side. The left mirror unit 26 also has an arrangement similar to the arrangement of the right mirror unit 26. A half mirror is used as aside mirror 263 in the example of FIG. 13 in a similar manner to the second embodiment. The same reference numerals are used to denote components which are similar to those of the second embodiment, and a description will be omitted.

The display device 10 according to this embodiment is, for example, a liquid crystal display device that includes a color liquid crystal panel and a backlight. The display screen of the display device 10 is arranged within a region R1 behind the side mirror 263. Note that it is also possible to employ a method in which the display screen of the display device 10 extends to a region R2 while display for notifying the rider of the approach of another vehicle is displayed in the region R1. If a normally black liquid crystal display device is employed as the display device 10, the entire region of the side mirror 263 will be able to be used as a mirror more easily since the display screen will become black in the non-display state.

The color and the position of an electronic image to be displayed by the display device 10 can be changed to obtain functions similar to those of the third and fourth embodiments. In this case, as shown by broken lines in FIG. 13, a camera 106, which is also exemplified in FIGS. 11 and 12, can be arranged so that the display color and the position can be automatically selected. The color and the position of the electronic image can be changed by an instruction input from a rider P on an input device 104.

Figure 14:
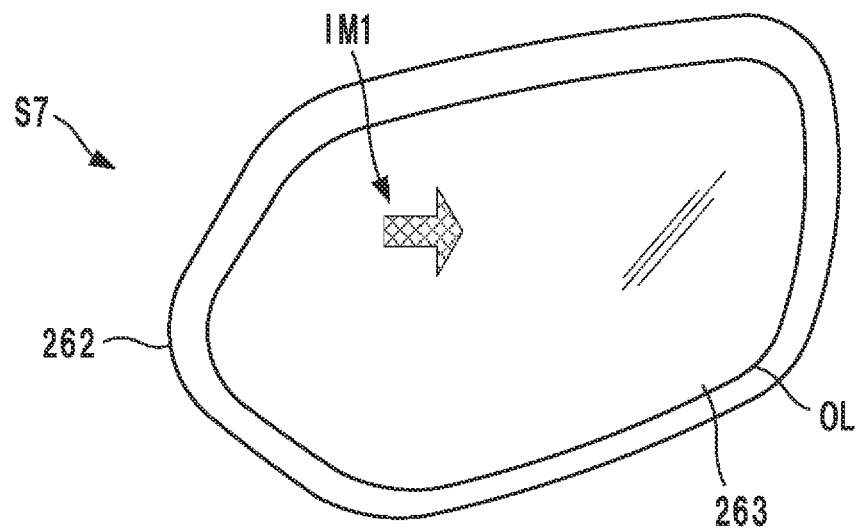
FIG. 14 is a view showing a display example of a display device of FIG. 13.
Figure 14:
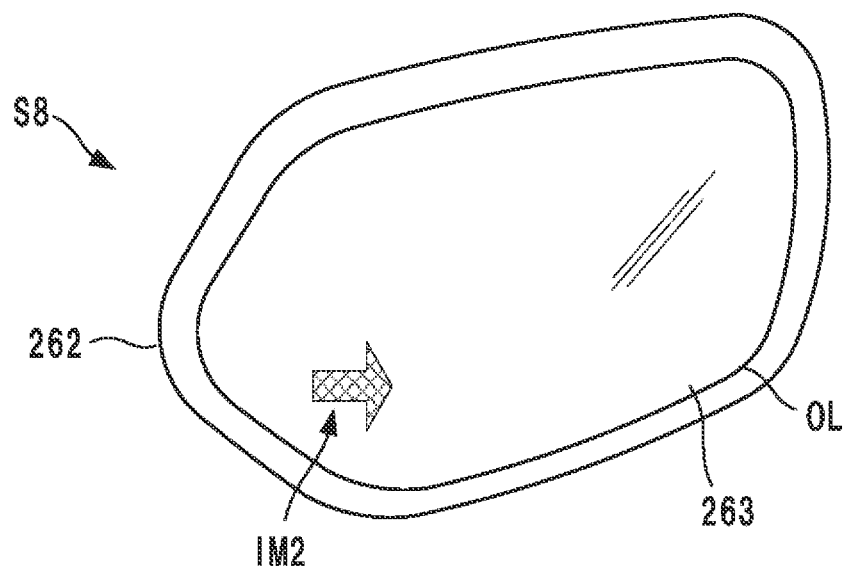
Figure 15:
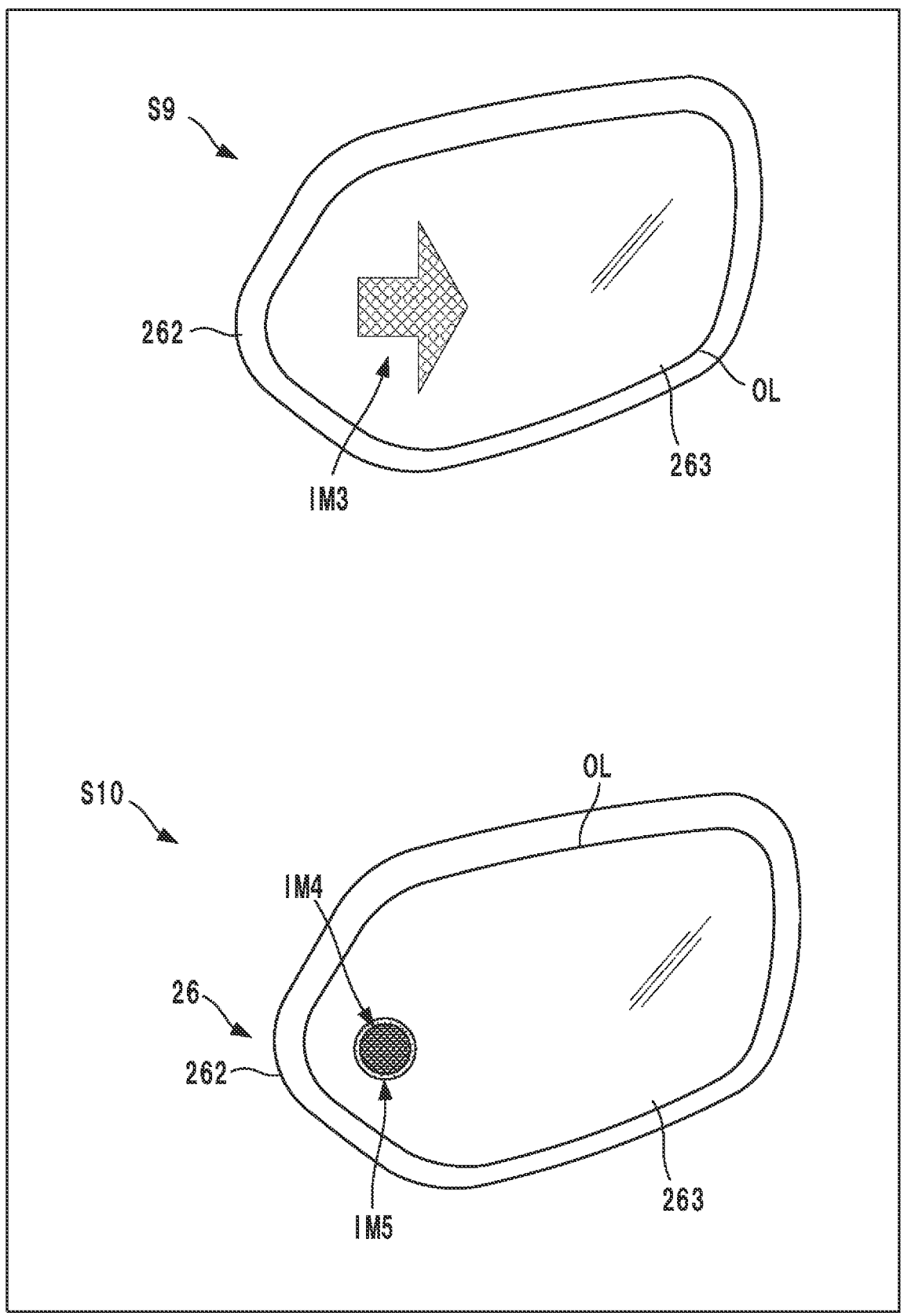
FIG. 15 is a view showing a display example of the display device of FIG. 13.

FIGS. 14 and 15 show display examples of the display device 10. Display IM1 shown in a state S7 of FIG. 14 is an image of an arrow and is an example of display for notifying the rider P that another vehicle is approaching from the rear right side. The display color of the display IM1 can be selected to be a color different from the color of the clothing of the rider P detected by the camera 106.

Although display IM2 shown in a state S8 of FIG. 14 is also an image of an arrow and is an example of display for notifying the rider P that another vehicle is approaching from the rear right side, the display position has changed from that in the state S7. Although display IM3 shown in a state S9 of FIG. 15 is also an image of an arrow and is an example of display for notifying the rider P that another vehicle is approaching from the rear right side, the size of the image changed from the sizes of the images in the states S7 and S8. The size and the shape of the display can be changed in this manner in a case in which another vehicle is approaching at a high speed. As a result, the rider P can be notified of whether the approach of the other vehicle is that of a high degree of urgency.

Display IM4 and display IM5 shown in a state S10 in FIG. 15 are examples in which the examples of FIGS. 8 to 10 of the third embodiment are displayed as electronic images. The display IM4 is a circular image modeled after the lighting of a dot light source such as an LED or the like, and is a region to display the result of the detection of another vehicle. The display IM5 is an image modeled after a peripheral member 10*d* and is an annular image surrounding the display IM4. The display color of the display IM4 and the display color of the display IM5 can be set to be different from each other so that the display IM4 can be emphasized to allow notification of the detection of another vehicle to be performed even if the body of the rider P is reflected in the side mirror 263. The display color of the display IM5 can be a color different from the color of the clothing of the rider P detected by the camera 106.

Other Embodiments

The embodiments of the present invention has been described above from the first embodiment to the fifth embodiment. However, the present invention is not limited to these embodiments. The embodiments can be combined with each other, and an alternative example described in one embodiment can be applied to another embodiment.

What is claimed is:

1. A straddle type vehicle comprising:
a side mirror on which a rider views in a rearward direction relative to the straddle type vehicle;
a color detection unit configured to detect a color of clothing of the rider,
a detection unit configured to detect another vehicle in a periphery of a self-vehicle; and
a display unit configured to display a detection result by the detection unit,
wherein the display unit displays the detection result at a position within a contour of the side mirror and on an inner side in a vehicle width direction, and
in a case in which the another vehicle is detected by the detection unit, the display unit displays a color, which is different from a display color of the detection result and is different from the color detected by the color detection unit, in a peripheral portion of a display region of the detection result.

2. The vehicle according to claim 1, wherein the side mirror is arranged at a position that at least partially overlaps a handle grip in the vehicle width direction.

3. The vehicle according to claim 1, wherein the display unit can display the detection result in a display color selected from a plurality of colors.

4. The vehicle according to claim 3, further comprising:
a selection unit configured to accept a selection of the display color by the rider,
wherein the display unit displays the detection result in the display color selected by the rider.

* * * * *